United States Patent
Batty et al.

(10) Patent No.: US 7,894,491 B2
(45) Date of Patent: Feb. 22, 2011

(54) DATA TRANSFER CIRCUIT

(75) Inventors: Sean Batty, Marston Moretaine (GB); Bhajan Singh, Birmingham (GB); Derek Colman, Bedfordshire (GB)

(73) Assignee: Texas Instruments Incorporated, Dallas, TX (US)

( * ) Notice: Subject to any disclaimer, the term of this patent is extended or adjusted under 35 U.S.C. 154(b) by 399 days.

(21) Appl. No.: 12/028,509

(22) Filed: Feb. 8, 2008

(65) Prior Publication Data

US 2008/0212607 A1 Sep. 4, 2008

Related U.S. Application Data

(60) Provisional application No. 61/017,043, filed on Dec. 27, 2007.

(30) Foreign Application Priority Data

Feb. 9, 2007 (GB) ................... 0702573.7

(51) Int. Cl.
*H04J 3/02* (2006.01)
(52) U.S. Cl. .................. 370/537; 370/532; 370/535
(58) Field of Classification Search .............. 370/532, 370/535, 537, 538, 539, 540, 541
See application file for complete search history.

(56) References Cited

U.S. PATENT DOCUMENTS

| | | | | |
|---|---|---|---|---|
| 4,720,830 A | * | 1/1988 | Joshi et al. | 714/775 |
| 5,557,217 A | * | 9/1996 | Pedersen | 326/39 |
| 5,761,209 A | | 6/1998 | Murakami | |
| 6,000,016 A | * | 12/1999 | Curtis et al. | 711/138 |
| 7,349,233 B2 | * | 3/2008 | Bains et al. | 365/63 |

(Continued)

FOREIGN PATENT DOCUMENTS

EP 0702573.7 11/1989

OTHER PUBLICATIONS

Sanjay Kasturia, et al; *Techniques for High-Speed Implementation of Nonlinear Cancellation*; IEEE Journal on Selected Areas in Comm.; vol. 9, No. 5; Jun. 1991; online; Cited in Foreign Search Rpt.

(Continued)

*Primary Examiner*—Kwang B Yao
*Assistant Examiner*—Nguyen Ngo
(74) *Attorney, Agent, or Firm*—John R. Pessetto; W. James Brady; Frederick J. Telecky, Jr.

(57) ABSTRACT

A data transfer circuit is provided for sending digital data at high rates across short but significant distances within an integrated circuit. The data is sent on parallel conductors that are divided into a number of groups. At the receiving end, a multiplexer selects each of the groups in turn and presents them at a set of conductors that are the same in number as one of the groups. At the transmitting end, a data marshalling circuit takes the bitstream to be transmitted and places it on the conductors in a particular redundant fashion so that the bitstream appears to advance across the set of outputs of the multiplexer. That is particularly useful where those outputs are presented to a pre-emphasis filter and line driver. The apparent data rate can be changed by making two or more of the groups of conductors have identical data.

8 Claims, 11 Drawing Sheets

U.S. PATENT DOCUMENTS

2005/0093871 A1* 5/2005 Filliman et al. ............. 345/536
2007/0223264 A1* 9/2007 Bains et al. .................. 365/63
2008/0212606 A1* 9/2008 Batty ......................... 370/464

OTHER PUBLICATIONS

Mike Harwood, et al; *A 12.5Gb/s SerDes in 65nm CMOS using a Buad-Rate ADC With Digital Receiver Equalization and Clock Recovery*; ISSCC 2007/Session 24/Multi-GB/S Transceivers/24; Feb. 14, 2007; Online; Cited in Foreign Search Rpt.

T. Beukema, et al; A 6.4-Gb/s CMOS SerDes Core With Feed-Forward and Decision-Feedback Equalization;, IEEE Journal of Solid-State Circuits; vol. 40, No. 12; Dec. 2005; Online; Cited in Foreign Search Rpt.

* cited by examiner

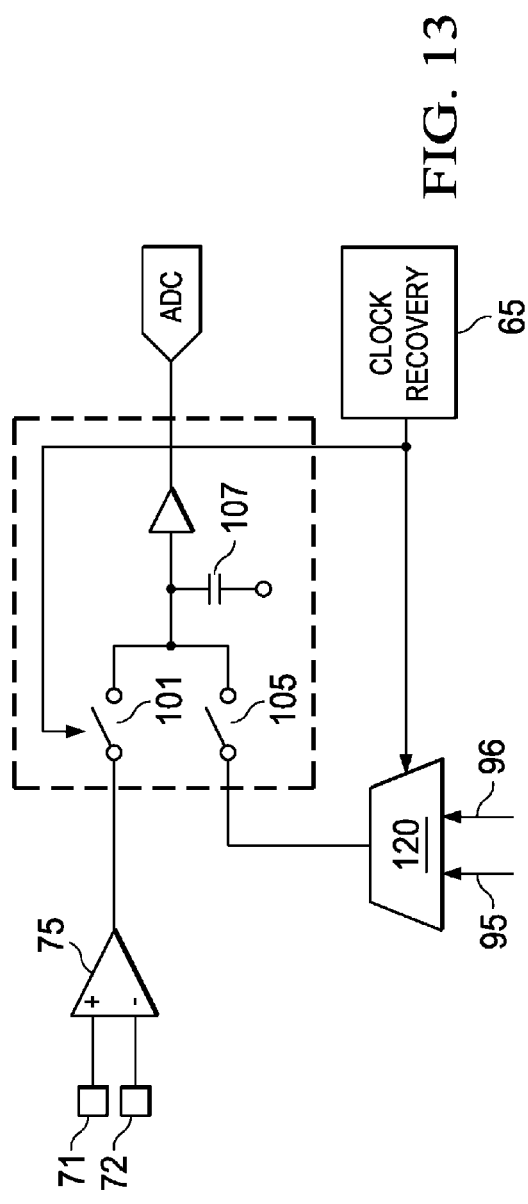
FIG. 13
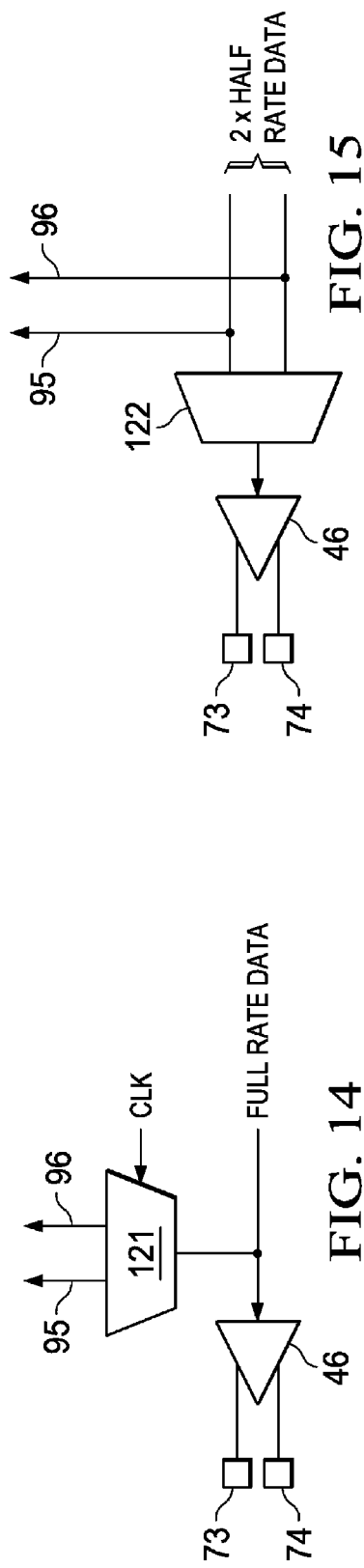
FIG. 15
FIG. 14

DATA TRANSFER CIRCUIT

This application claims priority under 35 U.S.C. 119(a) to GB Provisional Application No. 0702573.7 filed Feb. 9, 2007.

This application claims priority under 35 U.S.C. 119(e)(1) to U.S. Provisional Application No. 61/017,043 (TI-63553P) filed Dec. 27, 2007.

BACKGROUND OF THE INVENTION

The present invention relates to the transmission of data between circuits.

At very high data rates the transmission of data even within integrated circuits can present challenges. These include dissipation of the signal and using the same clock signal to time parts of the circuit that are some distance from each other. This application relates to several approaches to those problems taking as an example a data transmission and reception circuit.

SUMMARY OF THE INVENTION

The present invention provides in one aspect thereof a circuit comprising:
  a plurality of groups of conductors, each group being a plurality in number,
  a first multiplexer having the groups of conductors connected to it as its inputs and having a select input to select one of the groups as its output,
  a data marshalling circuit arranged to provide, from a source, groups of bits that are partially or fully overlapping with their neighbours, when the groups are considered in a particular order, and to output those groups on respective said groups of conductors, and
    a select circuit arranged to provide the select input to cycle the multiplexer output through the groups in the said particular order.

BRIEF DESCRIPTION OF THE DRAWINGS

Examples of the invention will now be described with reference to the accompanying drawings, of which:

FIG. 13 shows an alternative connection for the loopback channels at the receiver end, FIGS. 14 and 15 each show an alternative connection for the loopback channels at the transmitter end.

DETAILED DESCRIPTION OF THE PREFERRED EMBODIMENTS

A key challenge facing designers of high-bandwidth systems such as data-routers and super-computers is the requirement to transfer large amounts of data between ICs—either on the same circuit board or between boards. This data transmission application is called Serialisation-Deserialisation or "SerDes" for short. The present invention is useful in SerDes circuit and indeed was developed for that application. Nonetheless the invention may be used in other applications.

Analysis of typical backplane channel attenuation (which is around −24 dB) and package losses (−1 to −2 dB) in the presence of crosstalk predict that an un-equalized transceiver provides inadequate performance and that decision feedback equalization (DFE) is needed to achieve error rates of less than $10^{-17}$.

Traditional decision-feedback equalization (DFE) methods for SerDes receivers rely on either modifying, in analogue, the input signal based on the data history ["A 6.25 Gb/s Binary Adaptive DFE with First Post-Cursor tap Cancellation for Serial backplane Communications" R Payne et al *ISSCC* 2005; "A 6.4 Gb/s CMOS SerDes Core with feed-forward and Decision Feedback Equalization" M. Sorna et al *ISSCC* 2005; "A 4.8-6.4 Gb/s serial Link for Backplane Applications Using Decision Feedback Equalization" Balan et al *IEEE JSSC November* 2005.] or on having an adaptive analogue slicing level ["Techniques for High-Speed implementation of Non-linear cancellation" S. Kasturia *IEEE Journal on selected areas in Communications.* June 1991.] (i.e. the signal level at which the circuit decides whether the signal represents a 1 or a 0).

Figure 1:
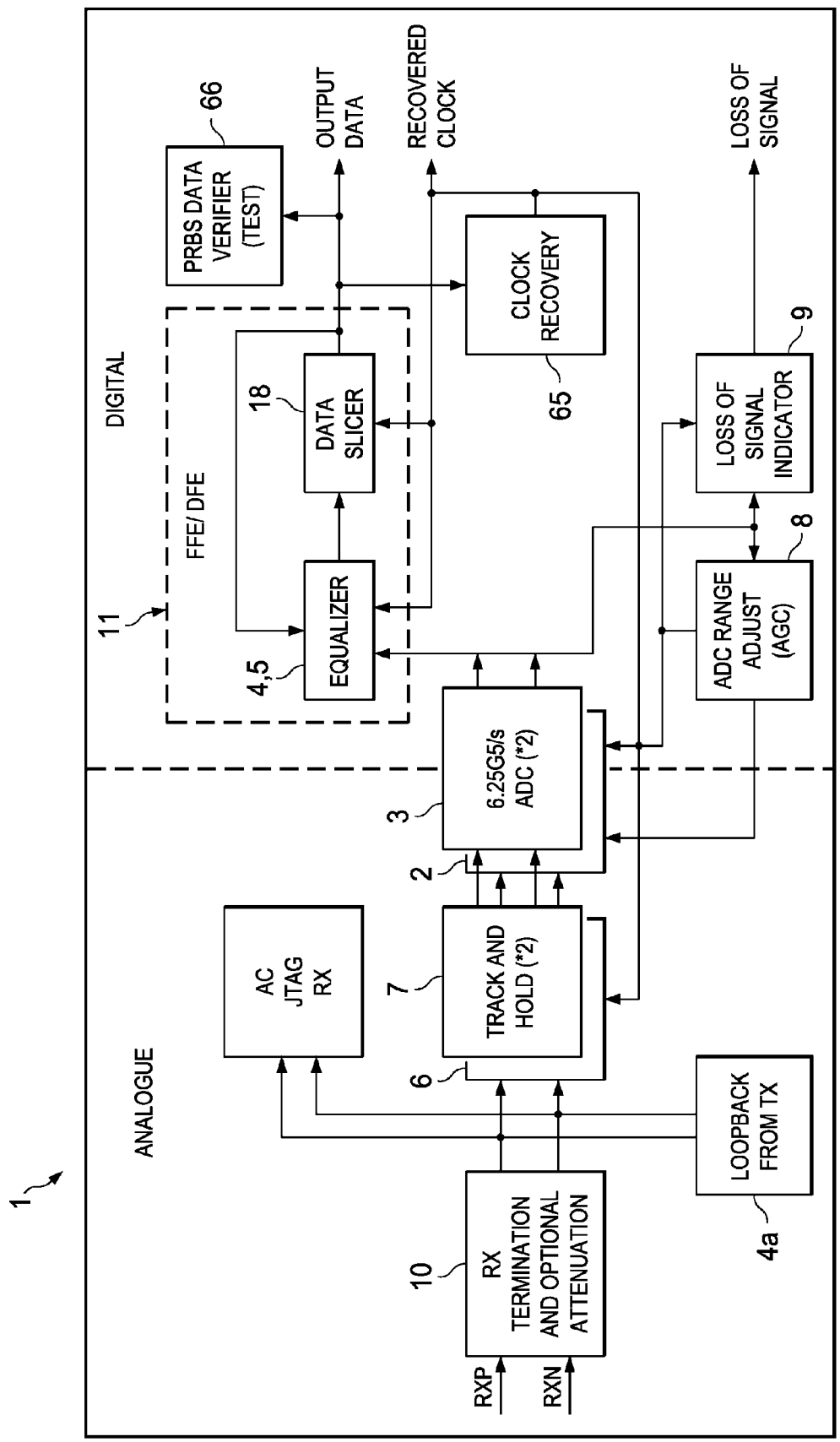
FIG. 1 is a block diagram a receiver circuit.

A block diagram of a SerDes receiver circuit 1, which forms part of an integrated circuit, in which the present invention may be used is shown in FIG. 1. The invention may nonetheless be used in other applications.

In the receiver circuit 1 of FIG. 1 the input data is sampled at the baud-rate, digitized and the equalization and clock & data recovery (CDR) performed using numerical digital processing techniques. This approach results in the superior power/area scaling with process of digital circuitry compared to that of analogue, simplifies production testing, allows straightforward integration of a feed-forward equalizer and provides a flexible design with a configurable number of filter taps in the decision feedback equaliser. The circuit has been implemented in 65 nm CMOS, operating at a rate of 12.5 Gb/s.

The receiver circuit 1 comprises two baud-rate sampling ADCs (analogue to digital converters) 2 and 3, a digital 2-tap FFE (feed forward equaliser) 4 and digital 5-tap DFE (decision feedback equaliser) 5 to correct channel impairments.

The SerDes section of the integrated circuit, which includes the receiver circuit 1 is also provided with a transmitter 40 (FIG. 4), connected to transmit data over a parallel channel to that which the receiver circuit 1 is connected to receive data. The transmitter 40 comprises a 4-tap FIR filter to pre-compensate for channel impairments. In many applications the integrated circuit transmitting data to the receiver circuit 1 uses pre-compensation and in particular a similar transmitter circuit 40, but in other applications the receiver circuit 1 works without pre-compensation being used at the other end The receiver 1 of FIG. 1 is now described in more detail. The received data is digitized at the baud-rate, typically 1.0 to 12.5 Gb/s, using a pair of interleaved track and hold stages (T/H) 6 and 7 and a respective pair of 23 level (4.5 bit) full-flash ADCs 2 and 3 (i.e. they sample and convert alternate bits of the received analogue data waveform). The two track & hold circuits enable interleaving of the half-rate ADCs and reduce signal related aperture timing errors. The two ADCs, each running at 6.25 Gb/s for 12.5 Gb/s incoming data rate provide baud-rate quantization of the received data. The ADC's dynamic range is normalized to the full input amplitude using a 7-bit automatic gain control (AGC) circuit 8. A loss of signal indication is provided by loss of signal unit 9 that detects when the gain control signal provided by the AGC is out-of-range. An optional attenuator is included in the termination block 10, which receives the signals from the transmission channel, to enable reception of large signals whilst minimizing signal overload.

Figure 2:
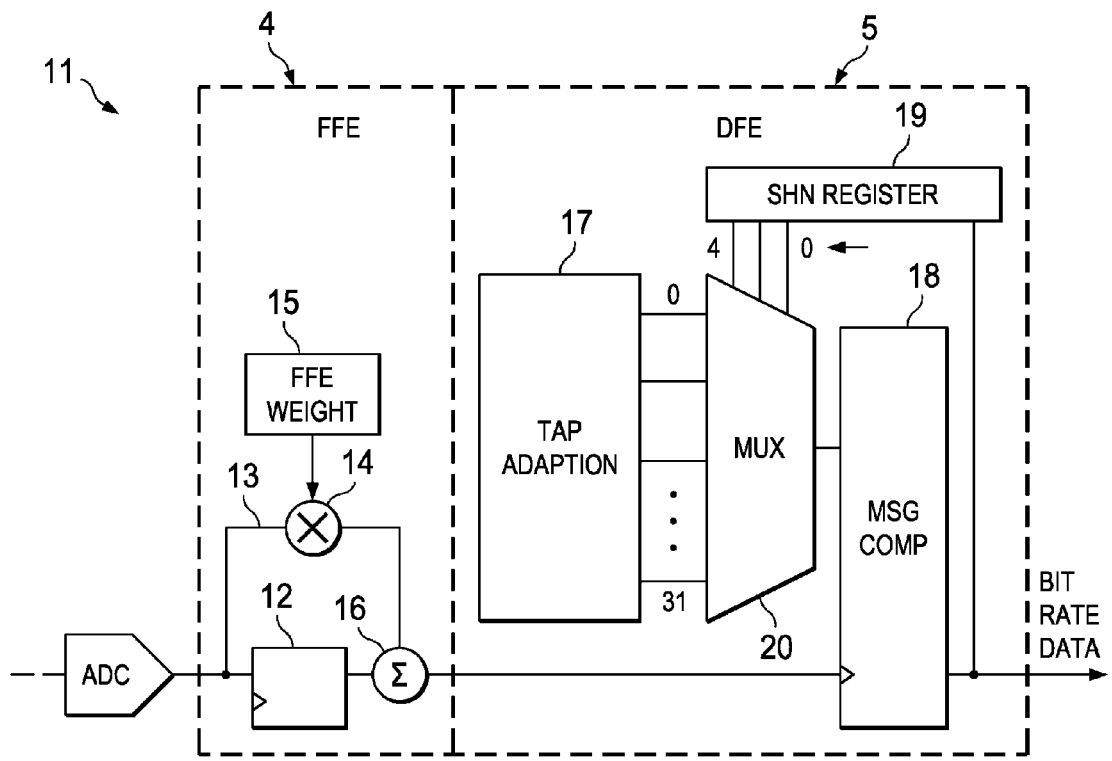
FIG. 2 shows the feed forward equaliser and the decision feedback equaliser of the receiver circuit of FIG. 1.

The digital samples output from the ADCs 2 and 3 are interleaved and the resulting stream of samples is fed into a custom digital signal processing (DSP) data-path that performs the numerical feed-forward equalization and decision-feedback equalization. This is shown in FIG. 2. This comprises a 1 UI delay register 12 connected to receive the stream of samples from the ADCs 2 and 3. (1 UI is a period of the clock, i.e. the delay between bits.) A tap 13 also feeds the samples from the ADCs to a multiplier 14, each sample being received by the delay latch 12 and the multiplier 14 at the same time. The multiplier 14 multiplies each sample by a constant weight value (held in a programmable register 15), which value is typically 10%. The outputs of the multiplier 14 and the delay register 12 are added together by an adder 16 to provide the output of the FFE 4.

The digital FFE/DFE is implemented using standard 65 nm library gates.

An advantage of applying the equalization digitally is that it is straightforward to include feed-forward equalization as a delay-and-add function without any noise-sensitive analogue delay elements. The FFE tap weight is selected before use to compensate for pre-cursor ISI and can be bypassed to reduce latency. Whilst many standards require pre-cursor de-emphasis at the transmitter, inclusion at the receiver allows improved bit error rate (BER) performance with existing legacy transmitters.

The DFE 5 uses an unrolled non-linear cancellation method ["Techniques for High-Speed implementation of Non-linear cancellation" S. Kasturia *IEEE Journal on selected areas in Communications*. June 1991]. The data output (i.e. the 1s and 0s originally transmitted) is the result of a magnitude comparison between the output of the FFE 4 and a slicer-level dynamically selected from a set stored in a set 17 of pre-programmed registers. The values are determined by a control circuit (not shown in FIG. 1) from the waveforms of test patterns sent during a setup phase of operation. The magnitude comparison is performed by a magnitude comparator 18 connected to receive the output of the FFE 4 and the selected slicer-level; it outputs a 1 if the former is higher than the latter and a 0 if it is lower or equal, thereby forming the output of the DFE 5.

The slicer-level is selected from one of 2n possible options depending on the previous n bits of data history. The history of the bits produced by the magnitude comparator 18 is recorded by a shift register 19 which is connected to shift them in. The parallel output of the shift register is connected to the select input of a multiplexer 20 whose data inputs are connected to the outputs of respective ones of the set 17 of registers holding the possible slicer-levels.

Unrolled tap adaption is performed using a least mean square (LMS) method where the optimum slicing level is defined to be the average of the two possible symbol amplitudes (+/−1) when proceeded by identical history bits. (For symmetry the symbols on the channel for the bit values 1 and 0 are given the values +1 and −1).

Although 5-taps of DFE were chosen for this implementation, this parameter is easily scaleable and performance can be traded-off against power consumption and die area. In addition, the digital equalizer is testable using standard ATPG (automatic test pattern generation) and circular built-in-self-test approaches.

Figure 3:
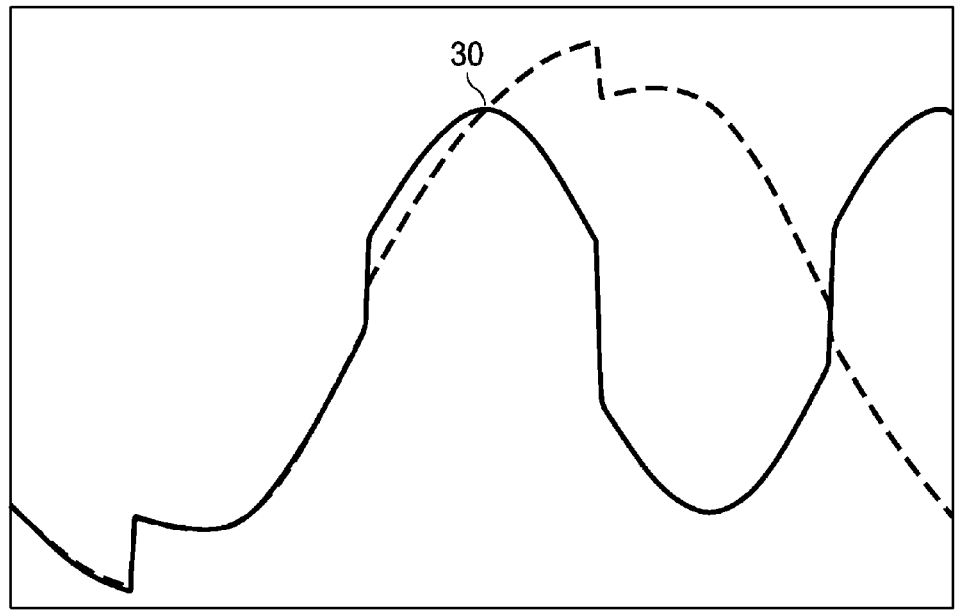
FIG. 3 is a graph showing the post equalised signal amplitude for exemplary bit patterns.

The chosen clock recovery approach uses a Muller-Mueller approach ["Timing recovery in Digital Synchronous Data Receivers" Mueller and Muller *IEEE Transactions on Communications* May 1976.] where the timing function adapts the T/H sample position to the point where the calculated pre-cursor inter-symbol interference (ISI) or $h(-1)$ is zero, an example being given in FIG. 3. The two curves show the post-equalized response for 010 and 011 data sequences respectively. The intersection 30 at 3440 ps occurs when the sample of the second bit is independent of the third bit—that is, $h(-1)=0$. This position can be detected by comparing the post-equalized symbol amplitude with the theoretical amplitude $h(0)$ and using the difference to update the CDR's phase-interpolator.

Figure 4:
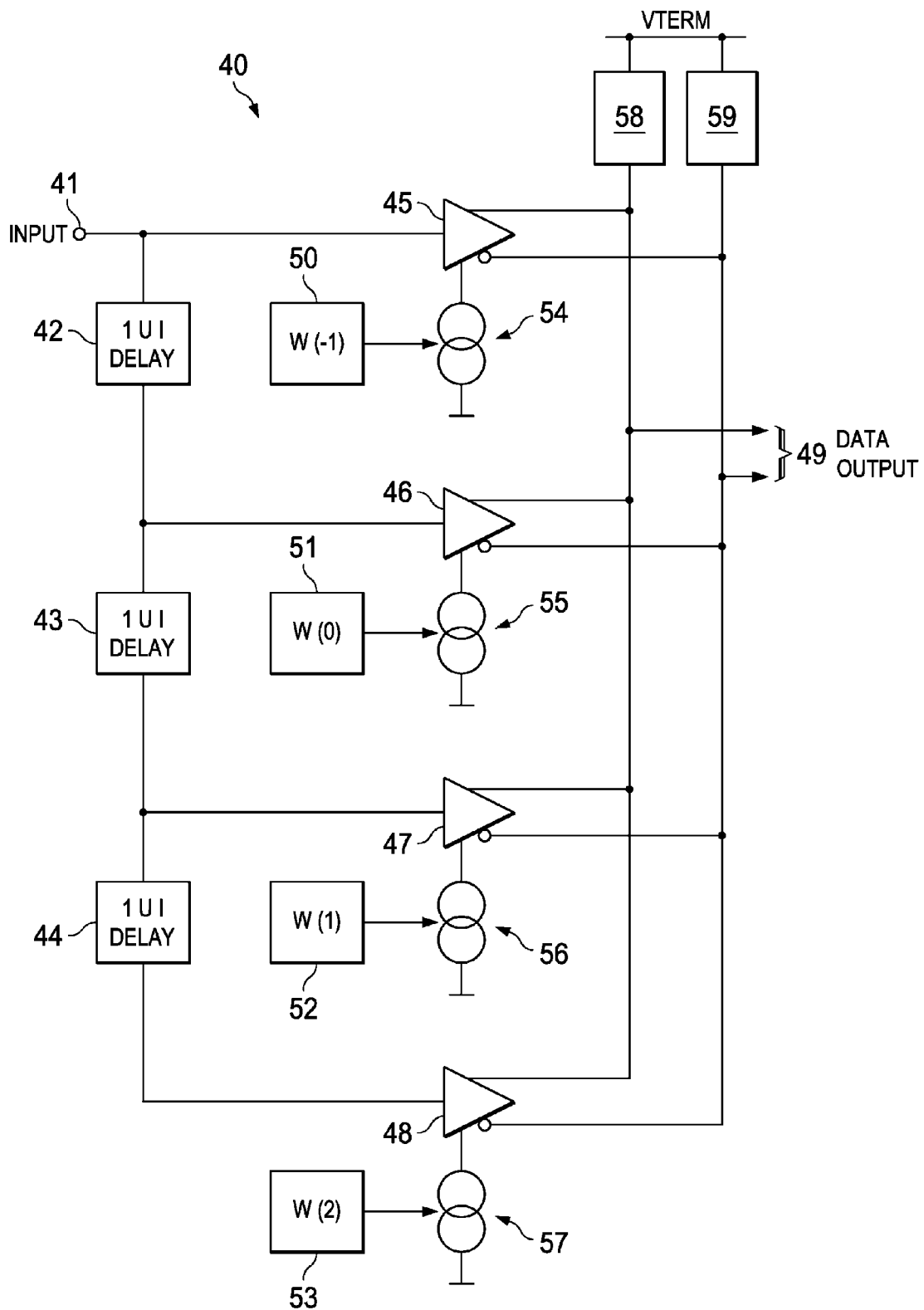
FIG. 4 is a diagram of a transmitter, with which the invention may be used.

A block diagram of the transmitter is shown in FIG. 4, which is implemented using CML techniques. The data to be transmitted (received at terminal 41) is sequentially delayed by three 1 UI delay registers 42, 43 and 44 connected in series. They produce, via the four taps before and after each delay, a nibble-wide word containing the pre-cursor, cursor and two post-cursor components. In fact to ease timing closure the data is sent to the transmitter from the digital part of the circuit that supplies the data in blocks of 4 nibbles (16 bits in parallel), the blocks being sent at a rate of 3.125/s. Each nibble is a frame of four bits of the bitstream offset by one bit from the next so the nibbles overlap and represent the data redundantly. A multiplexer then selects one of the nibbles, switching between them at a rate of $12.5\times10^9$/s, and presents that in parallel to the four taps, thereby making the bitstream appear to advance along the taps.

A 4-tap FIR output waveform is obtained from simple current summing of the time-delayed contributions. This is done with differential amplifiers 45 to 48, each having its inputs connected to a respective one of the taps and having its differential output connected to a common differential output 49. Although shown as four differential amplifiers the circuit is implemented as one differential amplifier with four inputs, which minimizes return-loss. The relative amplitude of each contribution is weighted to allow the FIR coefficients to be optimized for a given circuit (e.g. a backplane) and minimize the overall residual ISI. The weights are determined empirically either for a typical example of a particular backplane or once a backplane is populated and are stored in registers 50 to 53. The weights respectively control the controllable driving current sources 54 to 57 of the differential amplifiers 45 to 48 to scale their output current accordingly. Respective pull-up resistors 58 and 59 are connected to the two terminals of the differential output 49.

A PLL is used to generate low-jitter reference clocks for the transmitter and receiver to meet standards ["OIF-CEI-02.0—Common Electrical I/O (CEI)—Electrical and Jitter Interoperability agreements for 6 G+ bps and 11 G+ bps I/O". *Optical Internetworking Forum*, February 2005; "IEEE Draft 802.3 ap/Draft 3.0—Amendment: Electrical Ethernet Operation over Electrical Backplanes" *IEEE* July 2006.]. Most integrated circuits will have more than one receiver 1 and the PLL is shared between them with each receiver having a phase interpolator to set the phase to that of incoming data.

The PLL uses a ring oscillator to produce four clock-phases at a quarter of the line data-rate. The lower speed clocks allow power efficient clock distribution using CMOS logic levels, but need duty-cycle and quadrature correction at the point of use. The 3.125 GHz clocks are frequency doubled (XOR function) to provide the 6.25 GHz clock for the T/H & ADC. The transmitter uses the four separate 3.125 GHz-phases, but they require accurate alignment to meet jitter specifications of 0.15 UI p-p R.J. and 0.15 UI p-p D.J.

The system described has been fabricated using a 65 nm CMOS process and has been shown to provide error-free operation at 12.5 Gb/s over short channels (two 11 mm package traces, 30 cm low-loss PCB and two connectors). A legacy channel with −24 dB of attenuation at 3.75 GHz supports error free operation at 7.5 Gb/s.

Figure 5A:
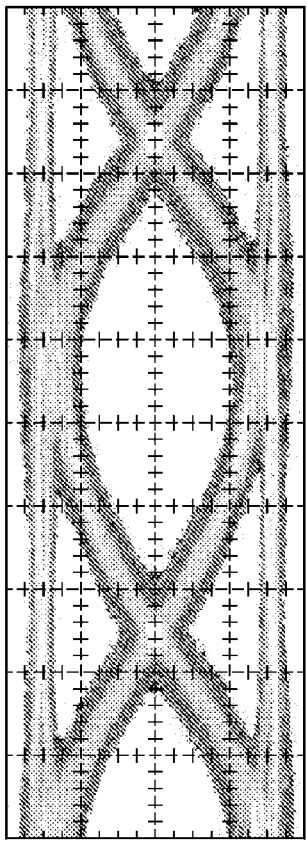
FIG. 5a shows the response of the receiver to a PRBS transmitted eye-pattern.
Figure 5B:
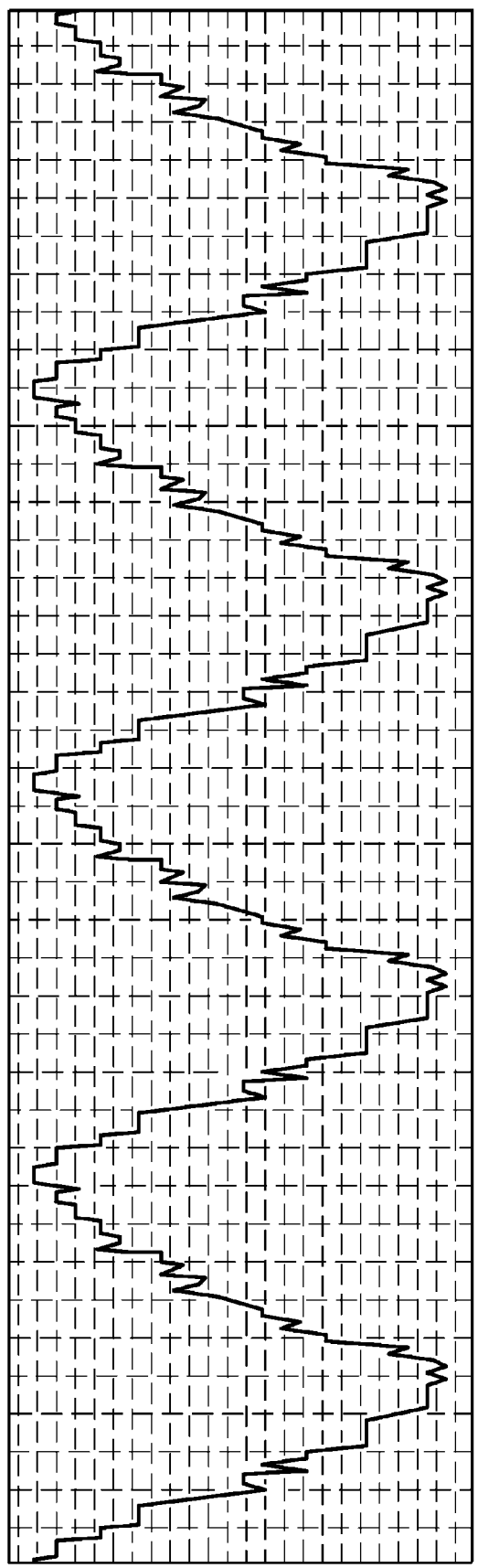
FIG. 5b shows the interleaved output of the ADCs of the receiver.

FIG. 5a shows a 12.5 Gb/s 27-1 pseudo random bit stream (PRBS) transmitted eye-pattern with 20% de-emphasis on the first post-cursor. The receiver includes, for test purposes, a PRBS data verifier 66, which confirms that the test pattern has been received. The differential peak-to-peak (pp) amplitude is 700 mV (200 mV/div). FIG. 5b shows the ADC output when a 6.25 GHz sine-wave is sampled and the phase between the sine-wave and receiver is incremented using a programmable delay-line. The measured codes are within +/−1 lsb (least significant bit) of the expected values. This level of performance ensures robust operation over a wide range of cables, green-field and legacy channels. The worst-case power of a single TX/RX pair, or "lane" is 330 mW and the total exemplary macro area is 0.45 mm$^2$ per lane (allowing for the PLL being shared by four TX/RX lanes.

Figure 6:
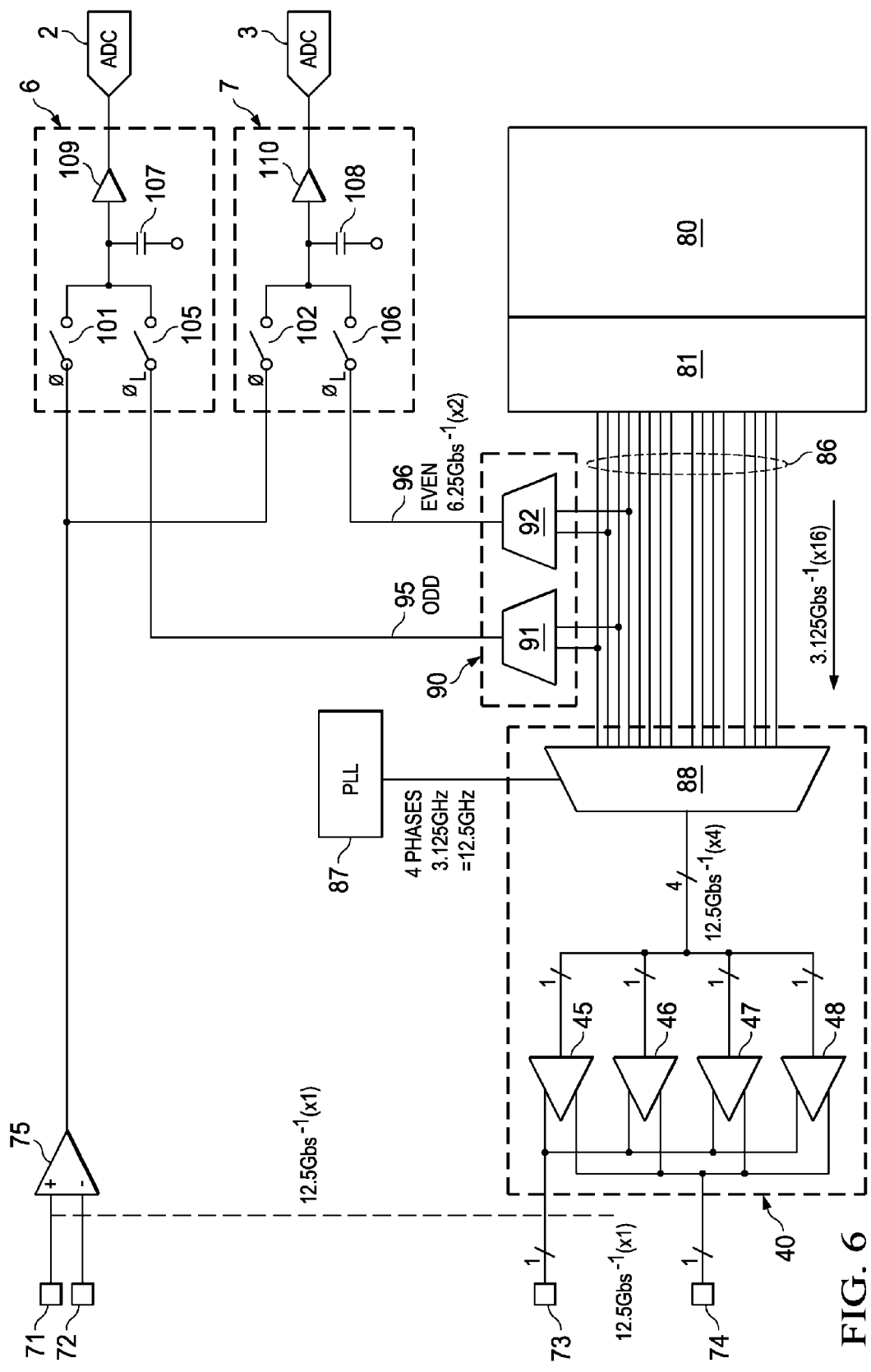
FIG. 6 shows the transmitter and receiver circuits in more detail.

FIG. 6 shows part of the receiver circuit 1 of FIG. 2 and the transmitter circuit 40 of FIG. 4 in more detail.

The transmitter 40 is shown at the bottom left of the FIG. 6 connected to provide its pre-emphasised differential waveform. In fact this is final digital to analog converter and line driver stage of the transmitter. Digital parts 80 of the circuit that provide the data to be transmitted are in another location in the integrated circuit. A data marshalling circuit 81 takes the data from digital circuit 80 and presents on over a set of parallel conductors 86 (in this example sixteen in number), which link the digital and analog driver parts of the transmission side of the circuit, in the redundant manner that is described briefly above and in more detail below.

Transmitter 40 comprises, in this preferred example, the differential amplifiers (or combined differential amplifier) 45 to 48 mentioned above, having the programmable weights that are applied to their inputs applied to their respective inputs, which inputs are either 1 or 0. The weights are chosen to provide the desired pre-emphasis. The transmitter also has a multiplexer 88 which selects a group of four bits from four groups of four bits transmitted to the transmitter 40 over the sixteen conductors 86 by the data marshalling circuit 81. The select input to the multiplexer is connected to receive four phases of a 3.125 GHz clock from the PLL, which servers four transmitter/receiver lanes. The multiplexer is therefore cycled through the four groups at the rate of, in this example, 12.5 GHz, giving the appearance of each data bit moving from input of the amplifiers 45 to 48 to the next each 1/(12.5×10$^9$)s resulting in the data bits being transmitted from circuit (via differential pads 73 and 74) at a rate of 12.5 Gbs$^{-1}$. This rate is referred to below, for reasons which will become clear, as the native rate of the transmitter.

Figure 7:
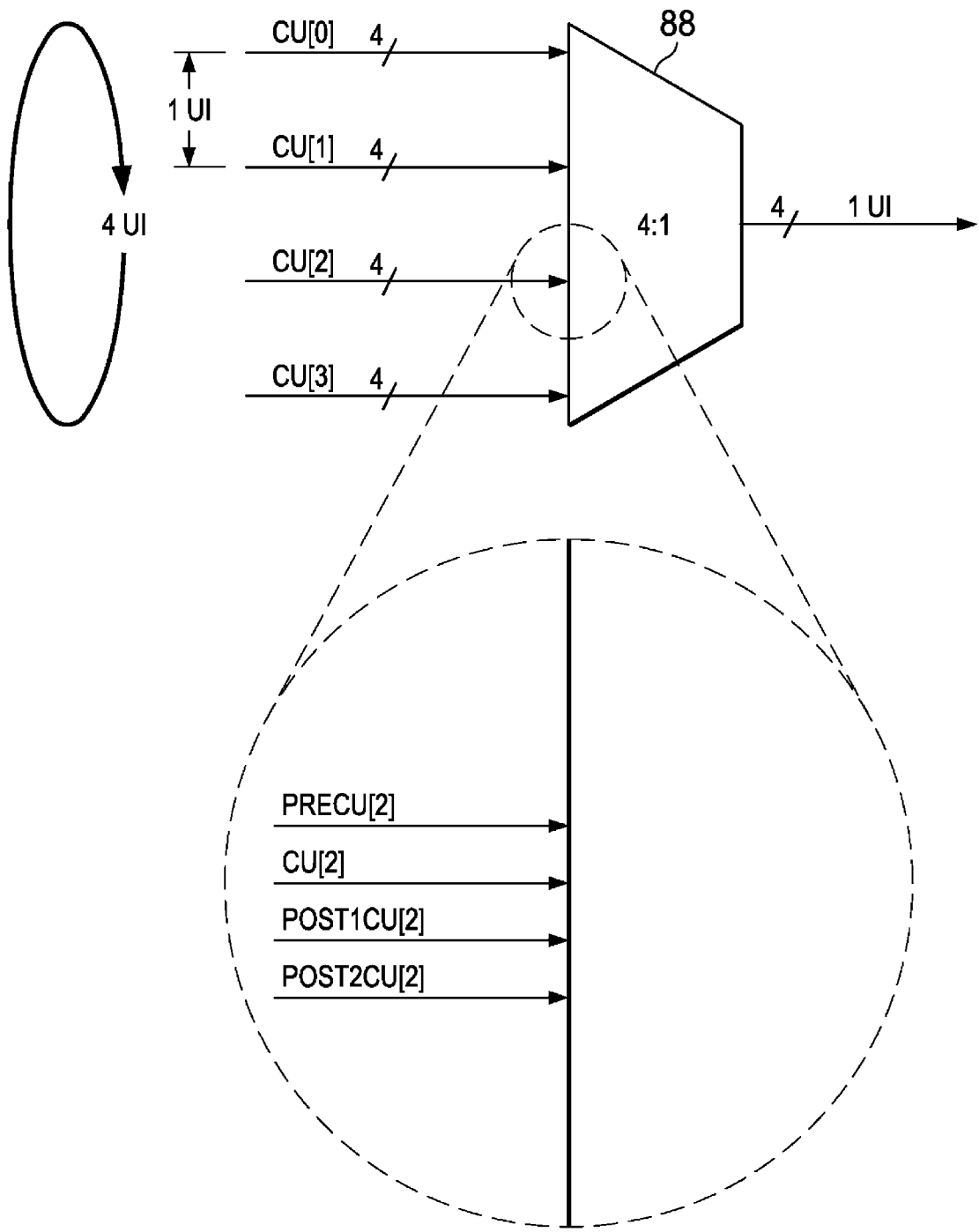
FIG. 7 shows the connections of a multiplexer in the transmitter circuit.

FIG. 7 shows the multiplexer 88 and the patterns of the data it controls in more detail. The multiplexer receives on the conductors 86 four groups (each being labelled by one of their members CU[0] to CU[3] in the upper portion of the Figure) each group comprising four bits, with one group of four bits being shown in the lower portion. Each group comprises the cursor bit CU, which is the bit being transmitted, its precursor PRECU (the bit transmitted immediately before it) and it nearest two postcursor bits POST1CU and POST2CU. The weighted amplifier combines those bits to shape the waveform of the transmitted data with the desired per-emphasis in order to combat ISI.

Figure 8:
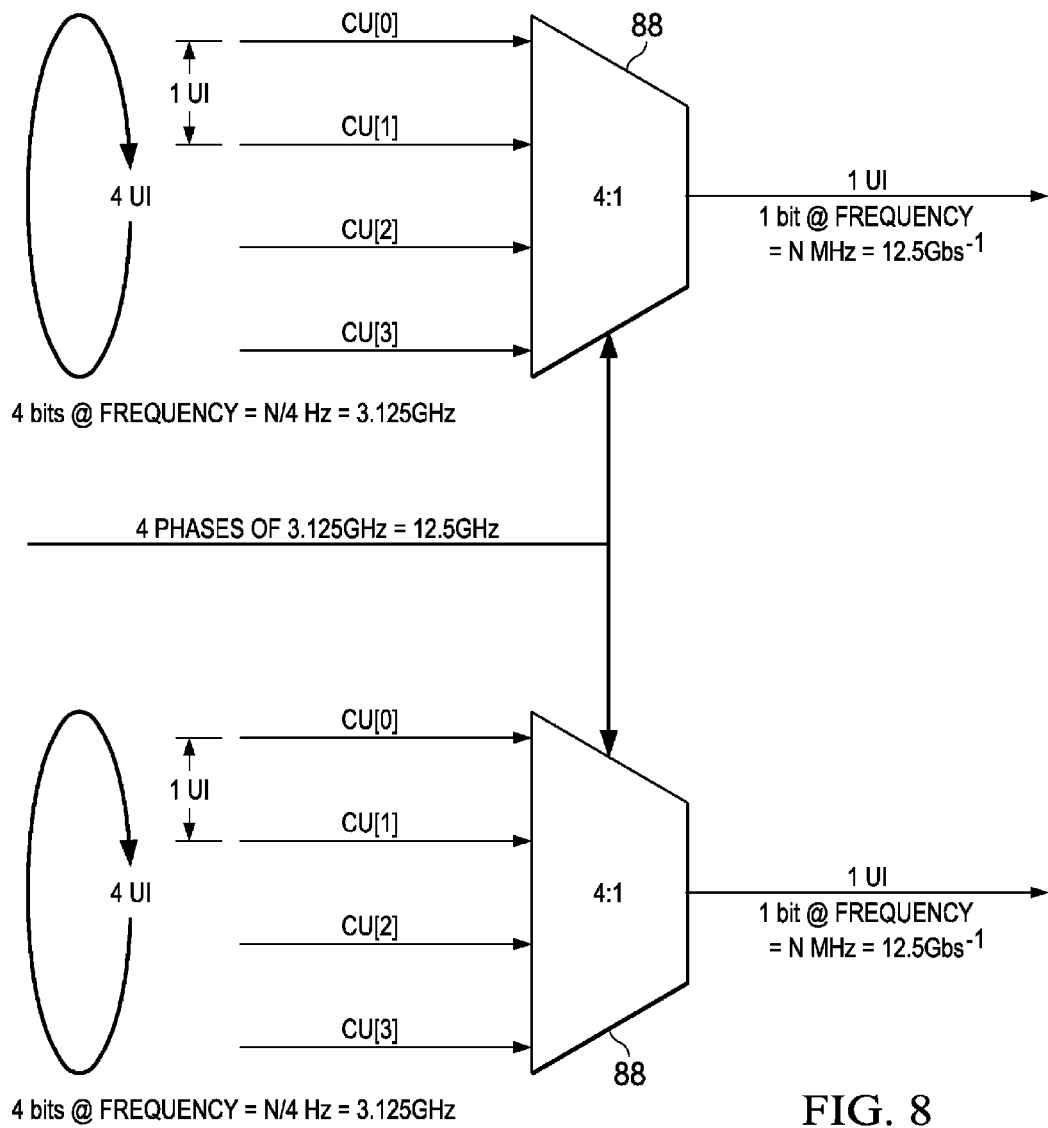
FIG. 8 shows two of the multiplexers in different transmitter lanes.

The bits on the conductors 86 are not independent but are redundant with PRECU[i+1]=CU[i], CU[i+1]=POST1CU[i], POST1CU[i+1]=PoST2CU[i] (the index being one unit of time UI). An advantage of this arrangement is that the data input to the multiplexer only changes at sub multiple of the data transmission rate of the output of the transmitter 40, in particular ¼ of the 12.5 Gbs$^{-1}$ rate (=3.125 Gbs$^{-1}$ on each of the conductors 86) since the multiplexer 99 is a 4:1 multiplexer. This relaxes the timing requirements as illustrated in FIG. 8, which shows the multiplexers 88 of the transmitters 40 of two lanes (each transmitting their own datastream) timed by the same PLL 87. Here the same clock signal (12.5 GHz—being 4 phases of 3.125 GHz) is applied to cycle both multiplexers, which presents no timing difficulty, whereas using the idealised arrangement shown in FIG. 4 of receiving the data into each transmitter on the single conductor 41 at the rate of 12.5 GBs$^{-1}$ and into the series of delay registers 42 to 44, also each clocked at the same rate, would be challenging since the time taken for the data and the clock signals would take to travel to those locations is significant at those frequencies.

In FIG. 8 the two transmitter lanes are shown as transmitting at the same rate. As will become clear from a later example below, one or other or both can be arranged to transmit at a different rate without changing the frequency of the clock signals provided by the PLL 87.

Figure 9:
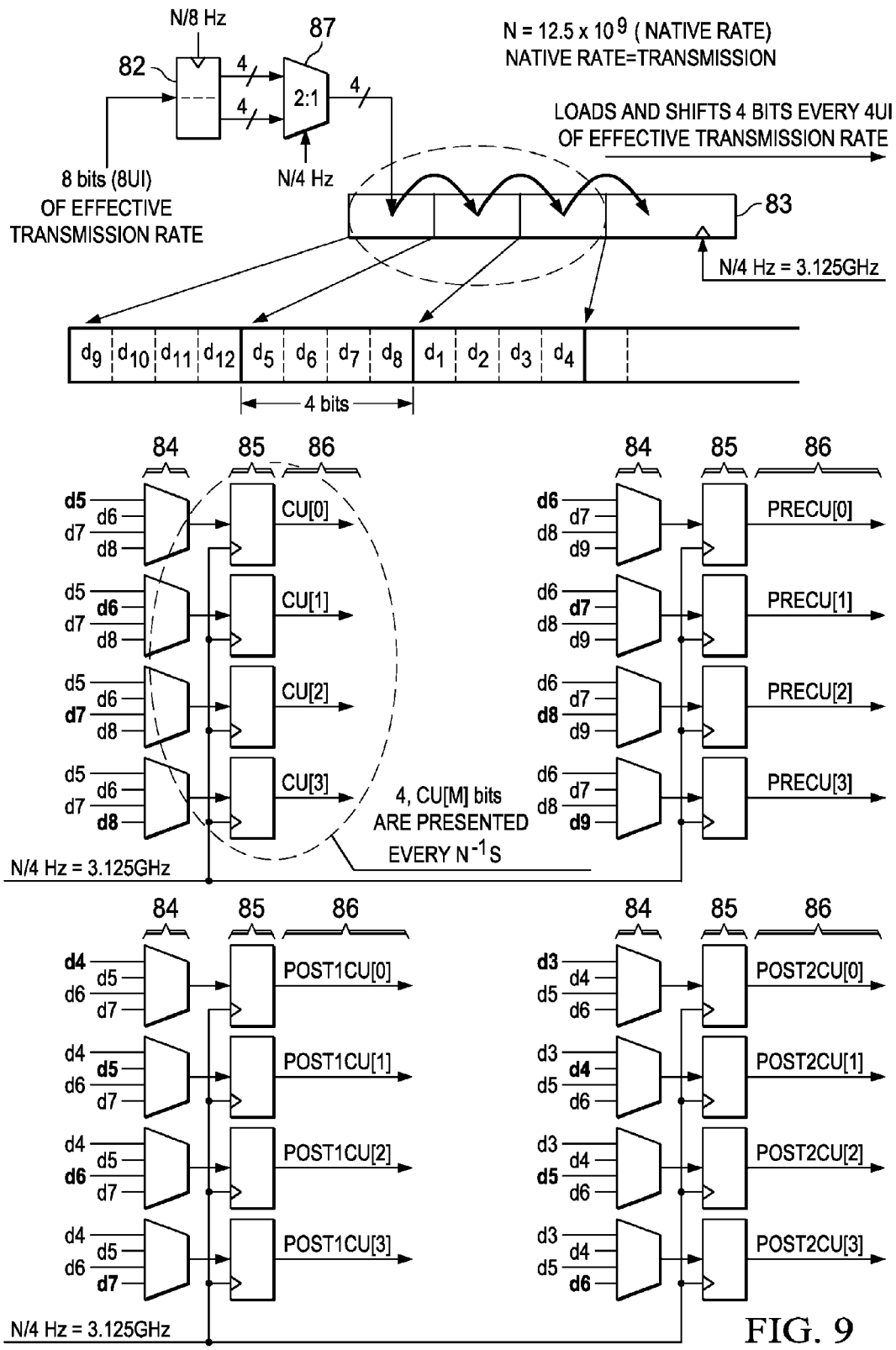
FIG. 9 is a block diagram of the data marshalling circuit.

FIG. 9 shows the components of the data marshalling circuit in the digital part 80 of the circuit, which takes the datastream to be transmitted and organises it in the redundant form on the conductors 86. The clock frequencies marked are for where the circuit is transmitting at the native rate of 12.5 Gbs$^{-1}$. Register 82 receives the datastream in the form of 8 bit bytes in parallel, at a rate of 1 byte every 8/(12.5×10$^9$)s. While each byte is in the register one of its component nibbles and then the other are selected in turn by a multiplexer 87 and loaded in parallel into a shift register 83. Each nibble is then moved along the shift register 4 places in one go every 4/(12.5×10$^9$)s. (This is implemented with four one bit sift registers in parallel.) The bits held in the shift register 83 are output in parallel and are connected to the inputs of a plurality of speed selection mulitplexers 84. To avoid confusion in the Figure the conductors making those connections are not shown as lines but are indicated with the d-symbols used to mark the bits of the shift register and the inputs of the multiplexers to which they are connected. The output of each multiplexer is latched by a respective latch 85. This is clocked at a rate of 3.125 GHz, i.e ¼ of the native rate of transmission from the transmitter circuit 40. The bit selected by each multiplexer is highlighted in bold in the Figure.

The selection made by each multiplexer 84 is controlled by a transmission speed select signal, which comprises 8 bits which are all distributed to each quadrant of the circuit of FIG. 9, two bits for each multiplexer (since each is a 4:1 multiplexer) with the same two bits going to the top multiplexer in each group. The speed select signal does not change during the transmission of a bitstream but if it is desired to transmit at a different speed then that can be done by changing the value of this signal.

In the case of full native rate transmission speed as shown in FIG. 9 the four groups of four bits transmitted to transmitter 40 on conductors 86 are therefore:

d6,d5,d4,d3 (on PRECU[0],CU[0],POST1CU[0], POST2CU[0]);
d7,d6,d5,d4 (on PRECU[1],CU[1],POST1CU[1], POST2CU[1]);
d8,d7,d6,d5 (on PRECU[2],CU[2],POST1CU[2], POST2CU[2]);
d9,d8,d7,d6 (on PRECU[3],CU[3],POST1CU[3], POST2CU[3]).

These are received by the multiplexer 88 in the transmitter 80, which selects those groups in that order. Once a cycle of that is completed the shift register 87 advances one nibble and a new set of bits is presented on conductors 86 through which multiplexer again cycles in groups of 4.

Figure 10:
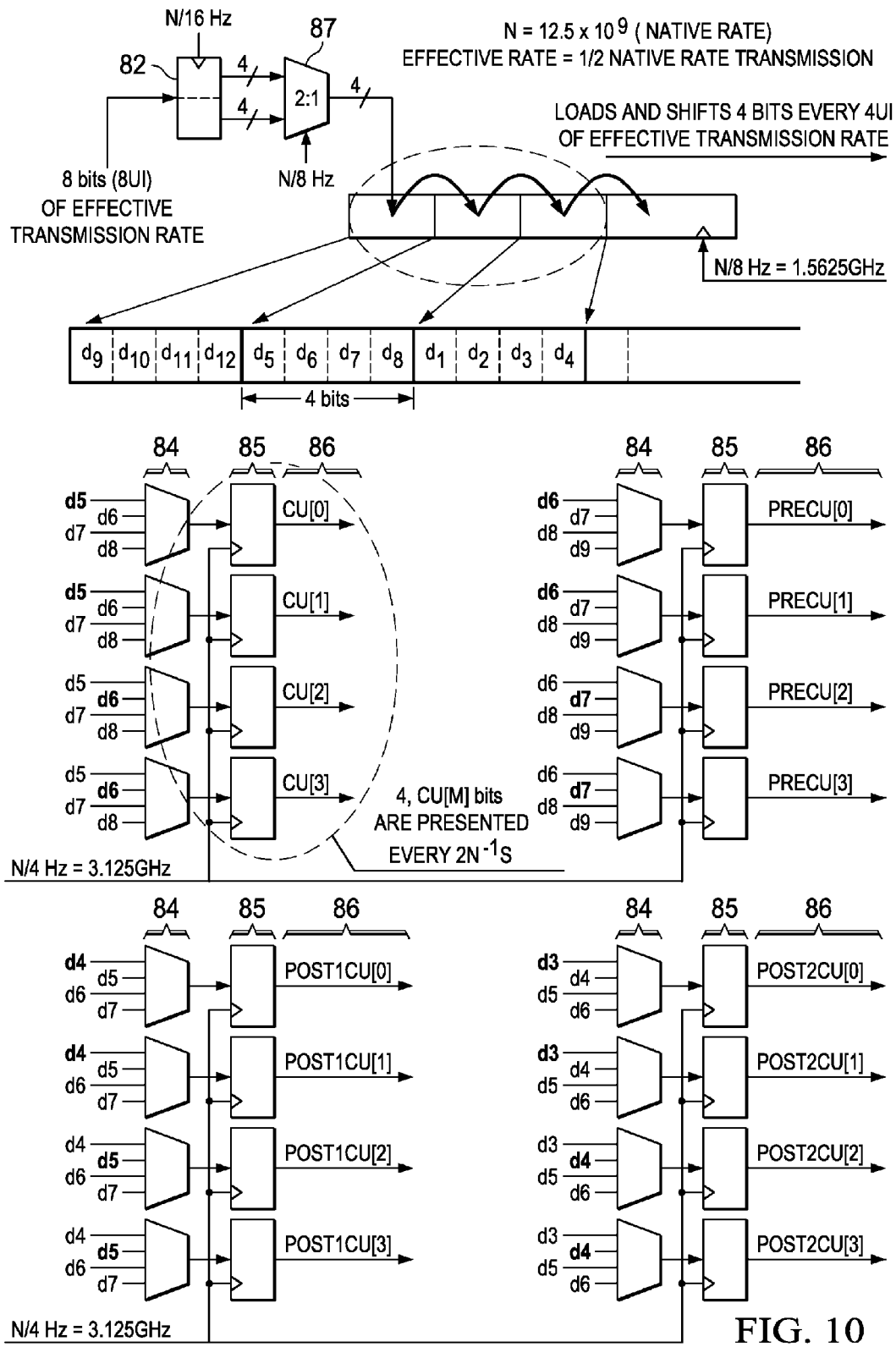
FIG. 10 shows the data marshalling circuit set up to transmit at a lower rate.
Figure 11:
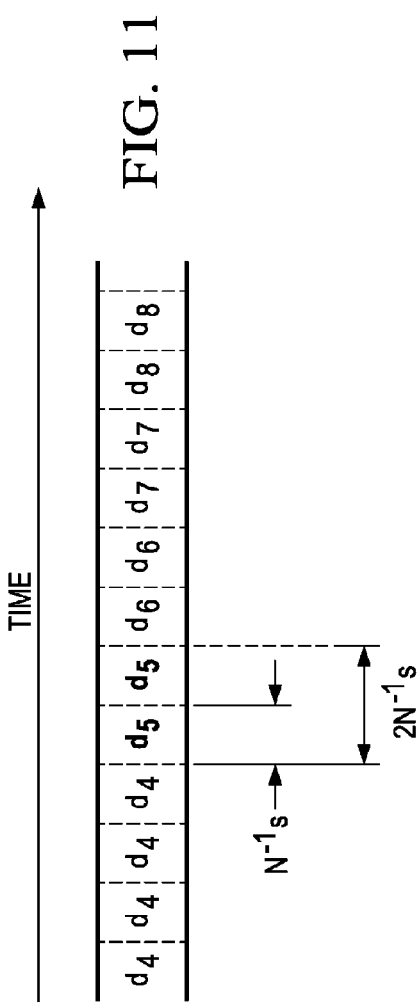
FIG. 11 shows the data output from the transmitter at that lower rate.
Figure 12:
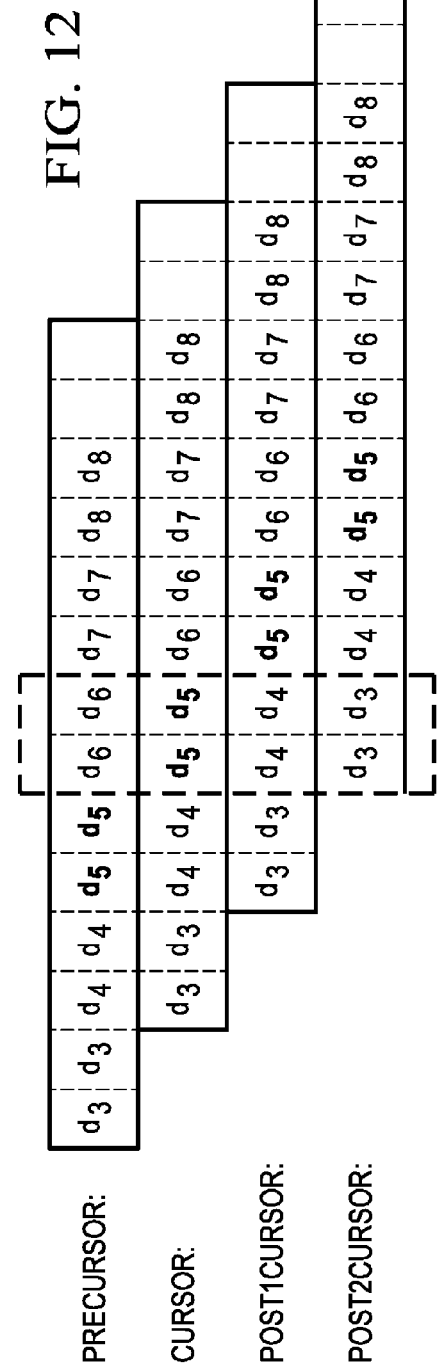
FIG. 12 is a diagram showing the data output by the multiplexer of the transmitter at the lower rate.

FIG. 10 shows the same circuit as FIG. 9 but with the transmission speed select signal set to cause the data to be transmitted from the transmission circuit at an effective rate of half the rate compared to the native rate set up in FIG. 9. FIG. 11 shows the result of the bits being output from transmitter 40 at the same native rate as before (in that latches 85 are again clocked at 3.125 GHz and the multiplexer 88 again switches it selection of group of conductors 86 at the same rate of 12.5 GHz) but this time successive pairs of groups have the same bits. This is done by selecting with the multiplexers 84 each bit to be presented on a total of two of the conductors 86 with multiplexer 88 then selecting that bit value twice as it makes one cycle through the four groups of bits (i.e. the group of PRECU[0], CU[0], POST1CU[0], POST2CU[0] consists of the same data as that of the group of PRECU[1], CU[1], POST1CU[1], POST2CU[1], and the group of PRECU[2], CU[2], POST1CU[2], POST2CU[2] consists of the same data as that of the group of PRECU[3], CU[3], POST1CU[3], POST2CU[3]). There is, therefore, no change in the level output by transmitter 40 as multiplexer 88 switches from one member of such a pair of groups to the other, thereby effectively transmitting the data at half the native rate. The dotted box in FIG. 12 shows the data output by multiplexer 88 during half of one of its cycles for this half rate transmission mode. Since the data is transmitted at half the rate the clock signals applied to register 82, multiplexer 87 and shift register 83 is each halved compared to FIG. 9. However latches 84 are clocked at the same rate as before, namely 3.125 GHz.

A data rate of ¼ of that of FIG. 9 is achieved by setting the transmission speed select signal by extending this spatial repetition of the data so that all four groups of conductors receive the same data (and reducing the clock rates applied to register 82, multiplexer 87 and shift register 83 by a factor of 4 compared to FIG. 9).

A further reduction is clock rate to ⅛ of the full rate is achieved by leaving the transmission speed select signal the same as for the ¼ rate mode but, compared to that, halving the rates of the clocks applied to the register 82, multiplexer 87 and shift register 83. In this mode every other time latches 84 latch shift register 87 has not advanced and so the same data is presented again on the conductors 86. Multiplexer 86 therefore outputs the same group of bits for a total of two of its cycles (which proceed at the same rate as in the full native rate case).

An advantage of this arrangement is that accurate reconfigurable frequency dividers do not have to be provided in the transmitter 40 because the effective change of frequency is made in the digital part, i.e. data marshalling circuit 81.

If it is only desired to send data at one rate then of course the multiplexers 84 can be omitted and the connection of the relevant bits (those in bold) can be made directly to the inputs of the latches 85.

Similar arrangements having numbers of groups selected by the multiplexer 88 different from four can of course be provided. With 12 groups one could provide not only submultiples of the full rate frequency that are integer powers of two but at frequencies that are ⅓ and ⅙ of that.

Returning now to FIG. 6, this Figure illustrates another aspect of the invention. Above there has been given details of the transmission side of the circuit. The Figure also shows the receiver side starting at differential input pads 71 and 72. The signals received here are amplified and referenced to circuit ground by an amplifier 75. The track and hold circuits 6 and 7 and analog to digital converts 2 and 3 are also shown (see also FIG. 1). In transmitter receiver pairs sometimes a loopback path is provided linking the output pads to the input pads as is indicated by the dotted line so that test data can be sent via the transmitter directly to the receiver to provide a test of both without involving any circuit board tracks or cabling. This approach is not adopted in this aspect of the invention owing to the loss of signal that occurs at the very high data rates, such as 12.5 Gbs$^{-1}$.

Instead there are provided two feedback channels 95 and 96 (each comprising a single conductor in this example). Loopback data is shared between these channels and is therefore transmitted at a lower rate; preferably the data is shared equally and so each operates at half the total rate. In this way the transmission and receiver halves of the circuit can be tested at full data rate but since the data rate on the loopback channels is halved the signal loss over the physical distance between the transmitter circuits and the receiver circuits is much reduced. If desired further loopback channels can be added to further reduce the data rate.

The receiver circuit of FIG. 6 has two track and hold circuits 6 and 7 which operate alternately with their input respective input switches 101 and 102 closing alternately to sample alternately the level on the pads 71 and 72 onto respective capacitors 107 and 108, from where they are amplified by respective amplifiers 109 and 110 and presented to the inputs of respective ADCs 2 and 3. (The clock signals are supplied by the clock recovery circuit 65 in the receiver—see FIG. 1.) In loopback mode those switches 101 and 102 are held open and two further switches 105 and 106 are held closed connecting the loopback channels 95 and 96 respectively to the sampling capacitors 107 and 108. This connection to the receiver circuit is advantageous because it isolates the loopback path from noise at the input pads 71 and 72. Accordingly such a connection will be useful even in cases where only a single loopback channel is being used.

Having two input stages and two loopback channels is, of course, a convenience in this particular case. If there is only a single input stage then the data on the loopback channels can be multiplexed into a single stream once it has arrived at the receiver circuit just before it is applied to the input stage. This arrangement is shown in FIG. 13 where multiplexer 120 is controlled by a clock signal again provided by the clock recovery circuit.

At the transmitter circuitry end of the loopback channels if the data is available at full rate it can be demultiplexed onto the loopback channels as shown in FIG. 14 where a demultiplexer 121 is connected to receive the full rate data and divide it between the two loopback channels, the full rate data being transmitted in normal operation by amplifier 46 to pads 73 and 74. In FIG. 6 this would correspond to picking up the data for loopback from the node between multiplexer 88 and amplifier 46. If the data is available in the transmitter side in two half rate streams these can be directly and respectively connected to the two loopback channels 95 and 96 as shown in FIG. 15 (in normal operation multiplexer 122 combining them before transmission by amplifier 46). FIG. 6 shows a further possibility in which the data is available at the transmitter side in four streams at an even lower rate than that to be used on the loopback streams, which is at the inputs to multiplexer 88. These could be used directly on four loopback channels in the manner of FIG. 15 but in order not to take up to much space and because half rate provides acceptable levels of signal loss for each of the two loopback channels a respective multiplexer 91, 92 is provided to multiplex a respective pair of the streams of transmission data. (Note that all the data is available on four of the conductors 86, on which, as noted above, the data is represented in redundant form).

What is claimed is:

1. A method of allowing data and transmit de-emphasis codes to be conveyed across an interface at different bit rates in multiple channels in a processor comprising:
   receiving a data stream in a form of n-bit words into a first register at a first clock frequency f1;
   loading first n/2 bit words from the first register into a shift register at a second clock frequency f2, wherein the second clock frequency f2 is equal to 2*f1, wherein one or more of the first n/2 bit words loaded into the shift register are shifted by n/2 bits at the second clock frequency f2;
   selecting outputs in parallel from the shift register such that two or more second n/2 bit words are stored in two or more n/2 bit latches, wherein the outputs of the two or more n/2 bit latches are connected to the multiple channels;
   connecting a multiple channel from the multiple channels to the interface at a clock frequency f3 until all of the multiple channels have been connected to the interface, wherein the clock frequency f3 is equal to 8*f1;
   wherein n is an even integer value equal to or greater than 2.

2. The method of claim 1 wherein n equals 8.

3. The method of claim 2 wherein the second n/2 bit words comprise a cursor bit (CU), a precursor bit (PRECU) and two postcursor bits (POSTCU).

4. The method of claim 3 wherein data presented on the interface is the same for more than one clock cycle, wherein the clock has a frequency f3.

5. A circuit for allowing data and transmit de-emphasis codes to be conveyed across an interface at different bit rates in multiple channels in a processor comprising:
   a first register, the first register receiving a data stream in a form of n-bit words at a first clock frequency f1;
   a shift register, the shift register loading first n/2 bit words from the first register into the shift register at a second clock frequency f2, wherein the second clock frequency f2 is equal to 2*f1, wherein one or more of the first n/2 bit words loaded into the shift register are shifted by n/2 bits at the second clock frequency f2;
   a first plurality of n/2 bit multiplexers, the first plurality of n/2 bit multiplexers selecting outputs in parallel from the shift register such that two or more second n/2 bit words are stored in two or more n/2 bit latches, wherein the outputs of the two or more n/2 bit latches are connected to the multiple channels;
   a multiplexer wherein inputs to the multiplexer are connected to the multiple channels and outputs of the multiplexer are connected to the interface; where each channel in the multiple channels is serially connected to the interface at a clock frequency f3 until all of the multiple channels have been connected to the interface;
   wherein n is an even integer value equal to or greater than 2.

6. The circuit of claim 5 wherein n equals 8.

7. The circuit of claim 6 wherein the second n/2 bit words comprise a cursor bit (CU), a precursor bit (PRECU) and two postcursor bits (POSTCU).

8. The circuit of claim 7 wherein data presented on the interface is the same for more than one clock cycle, wherein the clock has a frequency f3.

* * * * *